UNITED STATES PATENT OFFICE.

CONRAD SEMPER, OF PHILADELPHIA, PENNSYLVANIA, ASSIGNOR TO HARRISON, BROTHERS & CO., OF SAME PLACE.

SIZING MATERIAL FOR PAPER-MAKERS' USE.

SPECIFICATION forming part of Letters Patent No. 351,211, dated October 19, 1886.

Application filed July 22, 1885. Serial No. 172,288. (No specimens.)

*To all whom it may concern:*

Be it known that I, CONRAD SEMPER, of the city and county of Philadelphia, and the State of Pennsylvania, have invented a new and useful Improvement in the Manufacture of a Sizing Compound for Paper-Makers' Use, of which the following is a specification.

The object of my invention is to produce from ordinary ferruginous alum clay, bauxite, or other aluminous material containing iron, a neutral compound consisting, chiefly, of sulphate of alumina, protosulphate of iron, and sulphate of zinc, and having such mechanical properties that it may be advantageously used as a sizing material in the manufacture of paper.

I am aware that Letters Patent No. 208,615 have been granted to F. Laur, in which is described a method of making sulphate of alumina containing protosulphate of iron and sulphate of zinc.

The following is a convenient method of practicing my invention:

Ordinary aluminous material containing iron—such as bauxite or alum clay—is powdered or finely divided, and, if necessary, is roasted. In a suitable vessel this aluminous material is treated with a requisite quantity of hot or cold sulphuric acid. The strength or density of the sulphuric acid employed is optional. I prefer, however, to use and have obtained good results by the use of ordinary chamber acid, or an acid of, say, 50° Baumé. In most cases a violent reaction will soon take place; therefore, to prevent overflow, water or weak liquors from a previous operation should from time to time be sprinkled over the mass. After this action has ceased, should the mass be not already sufficiently diluted to prevent it from hardening, water or weak liquor from previous operations should be added. The solution is now cleared from the suspended particles of silica, undecomposed raw materials, or other impurities by subsidence or filtration, and is placed in suitable vessels, preferably lead-lined tanks. In these tanks the liquor is treated with a sufficient quantity of metallic zinc to reduce the ferric oxide present into ferrous oxide, and the solution, if not already sufficiently neutral or basic, is treated with the proper amount of oxide of zinc, oxide of magnesium, or other suitable neutralizing agent. It is to be understood that metallic zinc in any state of division—such as zinc dust, scrap, sheet-zinc, spelter, feathered spelter, or scrap-zinc of any description—may be employed. I do not confine myself to any special temperature at which the process described shall be practiced. Hot solutions, however, will expedite it. After the chemical reaction is terminated, which will be evidenced by a cessation of the evolution of hydrogen gas and a disappearance of the metallic zinc, the solution is, in any of the usual ways, freed from any foreign particles which it may contain, and is placed in vessels or tanks, in which it is brought to a higher state of concentration by heat. When the solution has been brought to such a degree of concentration that it will harden when cold—that is, to a density of about 60° to 65° Baumé, (more or less)—it is allowed to cool, and when it has become thick and viscid a proper quantity of bicarbonate of soda is sprinkled over and is quickly and thoroughly stirred into the mass, which is then placed in suitable receivers or on cooling-floors. The freed carbonic-acid gas is retained by and within the pasty mass of the partially-cooled compound, whereby said compound is made porous or cellular. It may when cold be crushed into lumps of suitable sizes ready for the market.

I do not confine myself to the use of bicarbonate of soda, as any other material or agent which will produce a porous condition of the mass may be employed.

It is obvious that a reduction of ferric oxide into ferrous oxide may be effected by other means than by the use of metallic zinc. I have found that sulphurous acid, sulphureted hydrogen, sulphites, bisulphites, and hyposulphites, as well as sulphides or polysulphides of the alkalies, alkaline earths, or metals, may be employed for the purpose.

Having thus described my invention, what I claim as new, and desire to secure by Letters Patent, is—

1. The process described of manufacturing a white neutral or basic porous material for paper-makers' use, and consisting, essentially, of sulphate of alumina, sulphate of zinc, and ferrous sulphate, substantially as set forth.

2. The process of manufacturing from any ferruginous aluminous material a white neutral or basic porous sizing material for paper-makers' use, containing zinc and iron, substantially as set forth.

3. The process of manufacturing from any suitable ferruginous aluminous material a white neutral or basic porous sizing material, which process consists in treating a solution of sulphate of alumina containing iron with a reducing agent to convert ferric sulphate into ferrous sulphate, and in then treating said solution with oxide of zinc or other suitable neutralizing material to render it neutral or basic, and in removing insoluble matter from said solution, should it be present, to obtain a clear solution, and in adding to said solution in a sufficiently-concentrated condition, and after it has become sufficiently cool, bicarbonate of soda, substantially as set forth.

In testimony whereof I have hereunto signed my name this 17th day of July, A. D. 1885.

CONRAD SEMPER.

In presence of—
WM. C. STRAWBRIDGE,
J. BONSALL TAYLOR.